United States Patent
Banerjee et al.

(10) Patent No.: US 8,464,257 B2
(45) Date of Patent: Jun. 11, 2013

(54) METHOD AND SYSTEM FOR REDUCING POWER LOSS TO BACKUP IO START TIME OF A STORAGE DEVICE IN A STORAGE VIRTUALIZATION ENVIRONMENT

(75) Inventors: Arindam Banerjee, Bangalore (IN); Satish Sangapu, Wichita, KS (US)

(73) Assignee: LSI Corporation, Milpitas, CA (US)

( * ) Notice: Subject to any disclaimer, the term of this patent is extended or adjusted under 35 U.S.C. 154(b) by 331 days.

(21) Appl. No.: 12/976,021

(22) Filed: Dec. 22, 2010

(65) Prior Publication Data

US 2012/0167079 A1 Jun. 28, 2012

(51) Int. Cl.
*G06F 9/455* (2006.01)
*G06F 21/00* (2006.01)

(52) U.S. Cl.
USPC .................................................. 718/1; 711/6

(58) Field of Classification Search
USPC .......................................... 718/1, 100; 711/6
See application file for complete search history.

(56) References Cited

U.S. PATENT DOCUMENTS

| 2004/0088589 A1* | 5/2004 | Westerinen et al. ........... 713/300 |
| 2009/0216816 A1* | 8/2009 | Basler et al. .................. 707/204 |
| 2010/0115509 A1* | 5/2010 | Kern et al. ......................... 718/1 |
| 2011/0072430 A1* | 3/2011 | Mani ................................ 718/1 |
| 2011/0202728 A1* | 8/2011 | Nichols et al. ................ 711/141 |
| 2012/0137289 A1* | 5/2012 | Nolterieke et al. ............... 718/1 |

* cited by examiner

*Primary Examiner* — Emerson Puente
*Assistant Examiner* — Willy W Huaracha

(57) ABSTRACT

A method and controller device for supplying battery power to a virtualized storage environment having a storage controller with a virtual machine manager and a second virtual machine. In response to a battery engaged event, the first virtual machine manager enables the image of the second virtual machine to be shared with a new instance of the second virtual machine so that the image does not have to be loaded therein. The first virtual machine manager then creates the new virtual machine. The old virtual machine shuts down non-necessary hardware devices and sets necessary hardware devices to low power mode. During this time, the new virtual machine executes a backup specific start-of-day (SOD) initialization sequence. The method also synchronizes the new and old virtual machines. The method also initiates a cache memory backup operation upon synchronization of the new and old virtual machines and then shuts down the old virtual machine.

20 Claims, 4 Drawing Sheets

METHOD AND SYSTEM FOR REDUCING POWER LOSS TO BACKUP IO START TIME OF A STORAGE DEVICE IN A STORAGE VIRTUALIZATION ENVIRONMENT

BACKGROUND OF THE INVENTION

1. Field of the Invention

The invention relates to storage devices or subsystems within a storage virtualization environment. More particularly, the invention relates to the use of battery power backup within a storage virtualization environment.

2. Description of the Related Art

Storage virtualization environments typically involve logical space (e.g., a storage subsystem) within a physical (disk) storage system. In a typical storage virtualization environment, there are multiple virtual machines (VMs) providing separate but dependent storage functions within a disk array controller or storage controller, such as a RAID (redundant array of inexpensive disks) controller.

In many hardware platforms that provide a storage virtualization environment, the power budgets while running on battery power are relatively tight. In the event of AC power loss to the storage device, the contents of cache memory, which contains the user data (also known as dirty data), needs to be offloaded to designated backup devices, e.g., flash memory devices, within a stipulated period of time beyond which the data storage system can not be powered up on battery power. Given the relatively limited battery holdup time, it is important not only to optimize the data throughput to the backup devices but also to ensure that the time required to perform the necessary functions to put the system in backup mode is within the stipulated limits. The time required to perform these functions is known as the power loss to backup IO (input/output) start time.

Conventional methods exist that provide for fault containment in systems where memory is shared by multiple virtual machines in a virtualization environment. Such fault containment can be provided by using a hypervisor that configures virtual machines in the virtualization environment each to have exclusive write access, via a remote direct memory access (RDMA) CONTROLLER, to a separate portion of a non-volatile solid-state memory (NVSSM) subsystem, such as flash memory and battery-backed DRAM (dynamic random access memory).

Also, conventional methods exist that share storage access among virtual machines within a virtualization environment having a plurality of virtual machines and a storage subsystem. In such method, a first virtual machine is configured to manage access to the storage subsystem and a second virtual machine issues IO requests to the first virtual machine so that the second virtual machine does not have to manage access to the storage subsystem.

SUMMARY OF THE INVENTION

The invention is embodied in a method and controller device for method for supplying battery power to a virtualized storage environment having a storage controller with a first virtual machine manager and at least one second virtual machine. The first virtual machine manager has loaded in a memory portion thereof an image of the second virtual machine. The method includes, in response to a battery engaged event, the first virtual machine manager shutting down all virtual machines in the storage controller except for the first virtual machine manager and the second virtual machine. The method also includes the first virtual machine manager enabling the image of the second virtual machine to be shared with a new instance of the second virtual machine in such a way that the image of the second virtual machine does not have to be loaded into a memory portion of the new instance of the second virtual machine. The first virtual machine manager then creates the new instance of the second virtual machine. The second virtual machine begins shutting down hardware devices in the virtualized storage environment that are not needed for cache memory backup or offload operation of the storage controller, and setting hardware devices in the virtualized storage environment needed for operation of the storage controller to low power mode. While the second virtual machine is setting the hardware devices needed for a cache memory backup operation of the storage controller to low power mode, the new instance of the second virtual machine executes a backup specific start-of-day (SOD) initialization sequence. The method also includes synchronizing the new instance of the second virtual machine with the second virtual machine in such a way that a cache memory portion of the virtualized storage environment is not concurrently accessed by the second virtual machine and the new instance of the second virtual machine. The method also includes initiating a cache memory backup operation upon synchronization of the new instance of the second virtual machine with the second virtual machine, and then shutting down the second virtual machine.

DETAILED DESCRIPTION OF EXEMPLARY EMBODIMENTS

Figure 1:
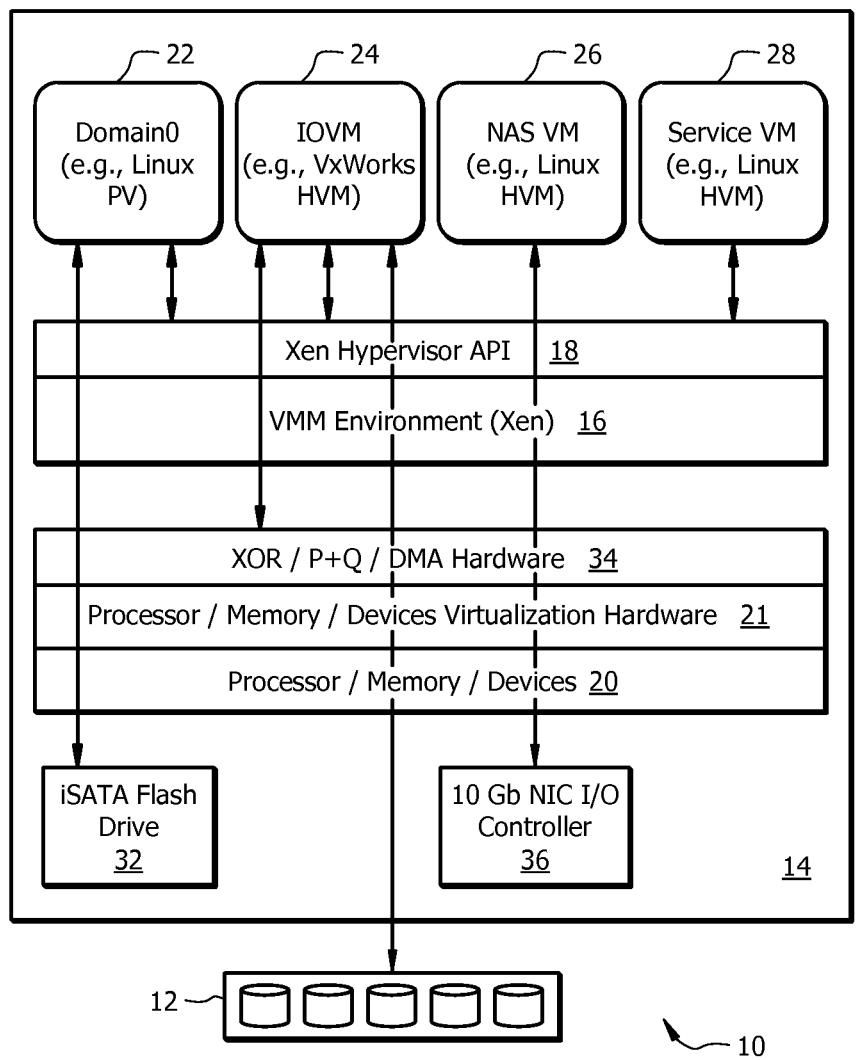
FIG. 1 is a schematic view of a virtualized storage environment.

In the following description, like reference numerals indicate like components to enhance the understanding of the invention through the description of the drawings. Also, although specific features, configurations and arrangements are discussed hereinbelow, it should be understood that such is done for illustrative purposes only. A person skilled in the relevant art will recognize that other steps, configurations and arrangements are useful without departing from the spirit and scope of the invention.

As used in this description, the terms "component," "module," and "system," are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes, such as in accordance with a signal having one or more data packets, e.g., data from one component interacting with another component in a local system, distributed system, and/or across a network, such as the Internet, with other systems by way of the signal.

As discussed hereinabove, in many hardware platforms that provide a storage virtualization environment, the power budgets while running on battery power are relatively tight. Thus, in the event of power loss or other occurrence when the system must run on backup battery power, it is important to perform all necessary data backup activities within allowable backup battery power time limits. Therefore, it is important to start the data backup activity as soon as possible from the time a power loss has occurred. However, there are system activities that need to be performed prior to the actual data backup I/O process starting. Such activities include turning necessary system devices into low power mode, including the rebooting of some devices or manipulating device states or registers, before the actual cache data offload begins. These activities should be performed as quickly as possible to reduce the power loss to backup IO start time as much as possible. That is, the time window between the instance in which power to the system is lost and the start of the cache offload to the designated data backup devices should be minimal.

As an example, to identify the limits that may be imposed on the power loss to backup IO start times, assume that the maximum supported cache size on a given storage virtualization environment hardware platform is approximately 8 gigabytes (GB), e.g., 8192 megabytes (MB). Also assume that the battery holdup time, e.g., as per thermal simulation data, is approximately 80 seconds (s), and the backup device throughput for backup-specific IOs (i.e., 99% sequential writes) is approximately 55 MB/s. If it is assumed that two (2) backup devices are used for a controller with 8 GB of cache memory, the sustained maximum cumulative backup device throughput for backup-specific IOs (99% sequential writes) is approximately 2×55=110 MB/s.

To determine the total amount of user data (dirty data) to be backed up, i.e., the data in cache memory that does not match the data in a corresponding memory location, assume that the size of the data portion used for debugging, e.g., a Diagnostic Data Capture, for an 8 GB cache memory is approximately 420 MB. Also, assume that the size of the recovery control block (RCB) data for an 8 GB cache memory is approximately 54 MB, and that the size of the debugging queue (DQ) data for an 8 GB cache memory is approximately 5 MB. Also, from other data sources, assume that an additional 10 MB of data also must be backed up. Thus, approximately 489 MB of data must be backed up, in addition to the actual cache dirty cache blocks (user data cache). Given these assumptions, the total size of the cache blocks to be backed up is approximately 6933 MB, i.e., 90% of 7703 MB (8192−489 MB). Therefore, the total amount of data to be backed up (i.e., from the cache blocks, the RCBs, the DDC and the DQ) is approximately 7400 MB.

As discussed, assuming that data backup occurs at the rate of 110 MB/s, it takes approximately 68 seconds to backup approximately 7400 MB of data. Given a battery holdup time of approximately 80 seconds, approximately 12 seconds of overhead time are left for the power loss to backup IO start time.

In the event that the storage system is to run on backup battery power, initially, the RAID controller cache memory backup IOs generally are started only after the storage controller completes a special start-of-day (SOD) sequence that brings up only the desired firmware components on battery power. This start-of-day sequence is important for system initialization to a stage where the cache management component can identify the dirty cache data from the cache metadata (i.e., the RCBs, which are recovery control blocks for the cache data). The time taken to execute this special start-of-day sequence typically is approximately 6 seconds. However, before the storage controller can start executing the backup-specific start-of-day sequence, the storage controller has to put the required hardware into a low power mode, shut down all unnecessary hardware and then reboot to come up in a backup SOD (start-of-day) mode.

In many conventional virtualization environments, the time required to accomplish these steps is approximately 22 seconds. For example, the time required to put the required hardware devices into low power mode is approximately 2 seconds. Also, the time required to destroy a virtual machine as necessary in many virtualized environments is approximately 2 seconds. Also, the time required to launch a virtual machine, including the creation of a new virtual BIOS (built-in operating system) is approximately 4 seconds. Also, the time required to load a RAID.elf image to the memory of the launched virtual machine is approximately 8 seconds. Also, the time required to execute a backup of the specific start-of-day sequence is approximately 6 seconds. However, as discussed hereinabove, the battery backup power budget typically is approximately 12 seconds.

Referring now to FIG. 1, shown is a virtualized storage environment 10, such as a virtualized storage environment suitable for use according to an embodiment of the invention. The virtualized storage environment 10 includes a data storage array, typically in the form of a plurality of disk drive units (such as a plurality of Serially attached SCSI (SAS) disk drives) stored within one or more disk drive expansion trays 12. Each data storage array typically includes at least one disk array controller or storage controller 14.

The storage controller 14 typically includes a Virtual Machine Management (VMM) module 16, which is a software module that abstracts and provisions the hardware resources for the virtual machines (VMs) in the storage controller 14. Xen is an example of a VMM environment or module. The VMM module 16 communicates with all virtual machines in the storage controller 14 via a suitable application program interface (API) 18. The storage controller 14 also includes the appropriate processor, memory element(s) and device(s) 20, and the appropriate corresponding processor, memory element and device virtualization hardware 21, for proper operation of the storage controller 14.

In many virtualized storage environments 10, the storage controller 14 includes four (4) virtual machines, e.g., a Domain0 (also referred to as Dom0) virtual machine 22, an input/output (IO) virtual machine 24 (IOVM), a Network Attached Storage virtual machine (NAS VM) 26 and a Service virtual machine (Service VM) 28. Typically, each virtual machine hosts a different functionality. That is, each virtual machine is a separate instance of an operation system that runs various services or functionalities.

The Domain0 22 can be a privileged or para-virtualized (PV) virtual machine for Linux or other suitable operating system. Para-virtualized generally describes an Operating System that is modified to run efficiently with Xen. Thus, the Domain0 22 can be a virtual machine that works closely with Xen to provide services for the virtualized storage environment 10. The Domain0 22 typically manages or controls the virtualized storage environment 10 as the designated VMM or Virtual Machine Manager. The Domain0 22 typically is configured to start and stop other virtual machines. Also, the Domain0 22 owns or controls a storage element or device 32, such as an iSATA (Serial Advanced Technology Attachment) flash drive, within or coupled to the storage controller 14. The storage device 32 is used for boot images of all of the virtual machines.

The IO virtual machine (IOVM) 24 provides RAID (redundant array of inexpensive disks) services for other virtual machines. Therefore, the IOVM 24 has direct access to a suitable direct memory access (DMA) hardware component 34, such as the XOR/P+Q DMA hardware. Also, the IOVM 24 has direct access to the back end disk drives, which typically are located in the disk drive expansion trays 12. The IOVM 24 can be a VxWorks Hardware Virtual Machine (HVM). In general, an HVM is an Operating System that is unmodified and has no knowledge of it being abstracted by a VMM module, e.g., the VMM module 16.

The NAS virtual machine (NAS VM) 26 provides file services and has direct access to a suitable input/output (I/O) controller 36, e.g., the 10 Gb NIC I/O Controller. The NAS VM 26 can be a Linux HVM.

The Service virtual machine (Service VM) 28, e.g., a Linux HVM, is used for systemwide software services, such as providing centralized logging. Another systemwide software service in which the Service VM 28 is used is coordinating firmware updates of the virtual machines.

As discussed hereinabove, in many hardware platforms that provide the virtualized storage environment 10, the power budgets while running on battery power are relatively tight. Therefore, in the event of power loss or other occurrence when the system must run on backup battery power, it is important not only to optimize the data throughput to the backup devices but also to ensure that the power loss to backup IO start time is within the stipulated limits. As shown in an example hereinabove, according to conventional implementations, the power loss to backup IO start time is approximately 22 seconds. However, conventional battery backup power budgets typically allow only 12 seconds for the power loss to backup IO start time.

According to embodiments of the invention, in a storage virtualization environment having a plurality of virtual machines, such as the Domain0 virtual machine and the IOVM, a binary image for the IOVM application (e.g., the RAID.elf image) is kept loaded in one of the virtual machines (e.g., the Domain0) and shared by the other virtual machine (e.g., the IOVM) in such a way that many backup power procedures of the other virtual machine can be performed in parallel, thus saving valuable backup battery power time during the creation and initialization of the new instance of the other virtual machine. Also, the sharing of memory pages, e.g., where the RAID.elf image is loaded, eliminates the need for loading the image into the other virtual machine memory, further saving valuable backup battery power time.

In conventional methods, the IOVM has to turn off unnecessary hardware devices, set necessary hardware devices to low power mode, and then reboot to come into the backup mode and execute the backup specific start-of-day (SOD) initialization sequence. In conventional methods, the IOVM serially performs the functions of setting devices into low power mode and then rebooting with specific components only in a backup specific mode. However, embodiments of the invention make use of a parallel (new instance of) IOVM, with memory pages being shared to split the necessary system tasks required prior to the backup IO being started between the old instance of the IOVM and the new instance of the IOVM.

It should be understood that embodiments of the invention can be used for persistent cache backup or cache memory backup solutions for any hardware platforms that provide a Virtual Machine Management Virtualization environment, such as the virtualized storage environment 10. According to embodiments of the invention, the ability to spawn a separate virtual machine that runs the backup-special start-of-day and executes backup-specific code can be reused as a feature across other suitable virtualization environments. Also, methods according to embodiments of the invention can provide less holdup time requirements for the backup battery pack, which leads to less expensive battery packs being used in storage devices and subsystems that provide virtualized environments and those that provide a cache memory for caching user data in a storage controller.

As will be described in greater detail hereinbelow, according to embodiments of the invention, a RAID.elf image is kept loaded in the memory of the Domain0 22. Upon the recognition of a power loss event to the controller 14, the VM manager of the controller 14 (i.e., the Domain0 22) is notified. The Domain0 22 then launches a new instance of the IOVM 24 in parallel to the old instance of IOVM 24, which, at this stage, is setting required hardware devices to low power mode. With respect to the memory pages where the RAID.elf image is loaded, the Domain 22 shares these memory pages with the new instance of the IOVM so that the new instance of the IOVM does not require loading of the RAID.elf image into its memory. The backup-specific start-of-day initialization sequence is executed through the newly launched IOVM in such a way that the initialization sequence runs in parallel to the old instance of the IOVM setting required hardware devices to low power mode, thereby saving some battery power backup time. The newly launched IOVM instance then is synchronized with the previously running (old) IOVM instance to ensure that the cache memory region is not concurrently accessed by both the new and old IOVMs. Immediately after this synchronization, the backup cache memory offload process is started. In this manner, these process activities and parallel operations save time that otherwise would be required to reboot the IOVM and time that otherwise would be required for the IOVM to execute the various portions of the backup-specific start-of-day initialization sequence, such as shutting down devices not needed for data backup operations and turning devices needed for data backup operations to low power modes of operation.

According to embodiments of the invention, the cache backup functionality and the optimization activities described herein are directed primarily to interactions between the Domain0 and the IOVM. Therefore, the figures and the corresponding description will be depicted accordingly. However, it should be understood that the optimization activities described herein can involve between other virtual machines as well. Also, it should be understood that a BBU (Battery Backup Unit) pack (not shown) typically is accessed by the virtualized storage environment 10 over an I2C (Inter Integrated Circuit or Inter IC) bus (not shown), and therefore is "owned" by the IOVM, because the IOVM hosts the I2O driver for accessing the device within which the virtualized storage environment 10 resides. Therefore, any power loss interrupt or "battery engaged" event is received by a firmware module running on the IOVM.

Figure 2:
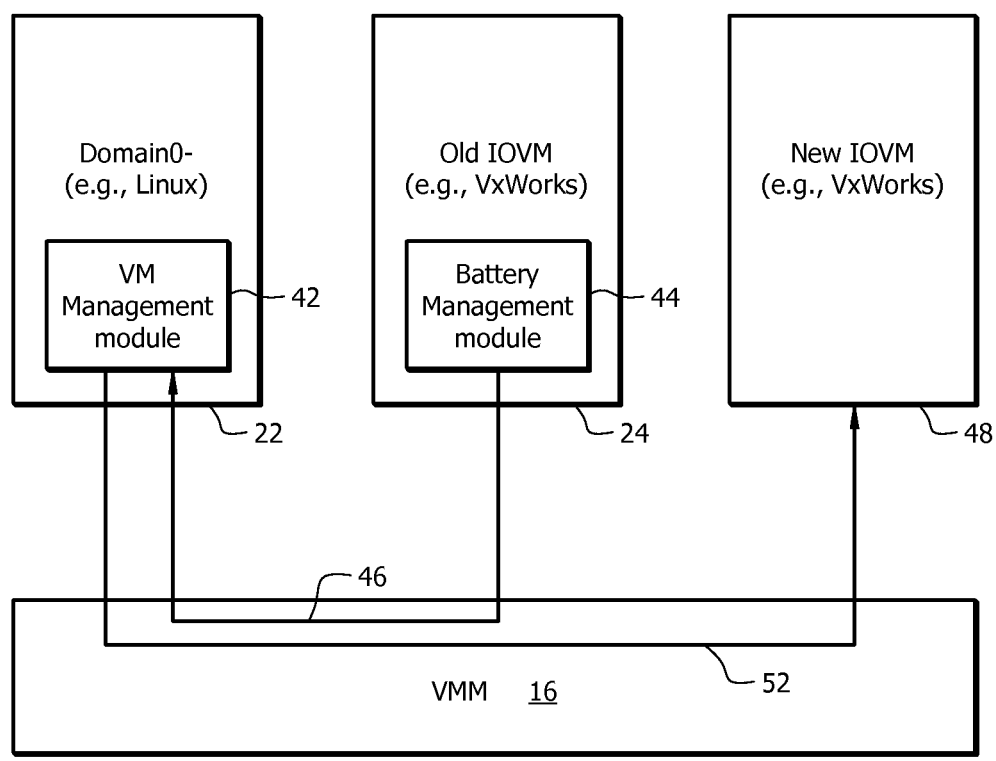
FIG. 2 is a schematic view of a portion of the virtualized storage environment of FIG. 1, illustrating a portion of the sequence of cache offload optimization activities according to embodiments of the invention.

Referring now to FIG. 2, shown is a schematic view of a portion of the virtualized storage environment 10 of FIG. 1, illustrating a portion of the sequence of cache offload optimization activities according to embodiments of the invention. The Domain0 22 can include a VM Management module 42 that is configured to manage all or a portion of the cache offload optimization activities performed by the Domain0 22. Also, the IOVM 24 can include a Battery Management module 44 that is configured to manage all or a portion of the cache offload optimization activities performed by the IOVM 24.

According to embodiments of the invention, at the time of system startup, the binary image for the IOVM application (i.e., the RAID.elf image) is loaded to a section of memory of the Domain0 22, and kept loaded therein. Because the RAID.elf binary image is only approximately 46 MB in size, and there are only a few applications running within the Domain0 virtual machine, keeping a RAID.elf binary image loaded within the memory of the Domain0 is not an issue with respect to memory availability for other Domain0 applications.

The Domain0 22 registers with the IOVM 24 to be notified of a backup battery engaged event (e.g., power loss to the storage system) because the Domain0 22 has to shut down the virtual machines other than the IOVM 24, i.e., the NAS VM 26 and the Service VM 28, which do not have any role to play in a typical cache memory backup operation. Moreover, keeping the other virtual machines alive would also require their corresponding CPU cores to be powered up, and such unnecessary powering up of CPU cores would result in unnecessary power consumption when operating on backup battery power, thereby reducing actual backup battery power operation times.

When a backup battery engaged event occurs, the IOVM 24 receives a power loss interrupt signal. The IOVM 24, via its Battery Management module 44, and via the VMM 16, notifies the Domain0 22 of the loss of power. This notification is shown generally as a notification 46 of a battery engaged event. The Domain0 22 then shuts down or destroys all virtual machines in the controller 14 other than the IOVM 24, i.e., the NAS VM 26 and the Service VM 28. Also, the Domain0 22, via its VM Management module 42, and via the VMM 16, starts or spawns a separate or new instance of the IOVM, e.g., a new IOVM 48 (IOVM$_{new}$ 48). This spawning is shown generally as a spawning 52 of the new IOVM 48.

While the Domain0 22 is spawning the new IOVM 48, the current or old instance of the IOVM, i.e., the (old) IOVM 24, begins powering off unwanted hardware devices to reduce power consumption on the battery backed up power. The old IOVM 24 also begins setting any required hardware devices to operate in low power mode to further reduce power consumption on the battery backed up power. The devices can be turned to their low power mode of operation in any suitable manner, e.g., by manipulating device states and/or accessing some device registry bits or device firmware handling power to the device.

While the Domain0 is spawning the new IOVM 48, the Domain0 22 also enables the memory region of the Domain0 22 where the RAID.elf image is loaded to be shared with the new IOVM 48. This sharing enablement is possible because the Domain0 22 controls the hardware and memory apportioning for different virtual machines in the controller 14. This shared memory arrangement allows the new IOVM 48 to start immediately because the new IOVM 48 does not need to load the RAID.elf image from the flash memory device 32 to its memory, i.e., the RAID.elf image is available immediately through the shared memory. Eliminating the need to load the RAID.elf image from the flash memory device to the memory of the new IOVM 48 saves approximately 8 seconds of backup battery power consumption time.

Figure 3:
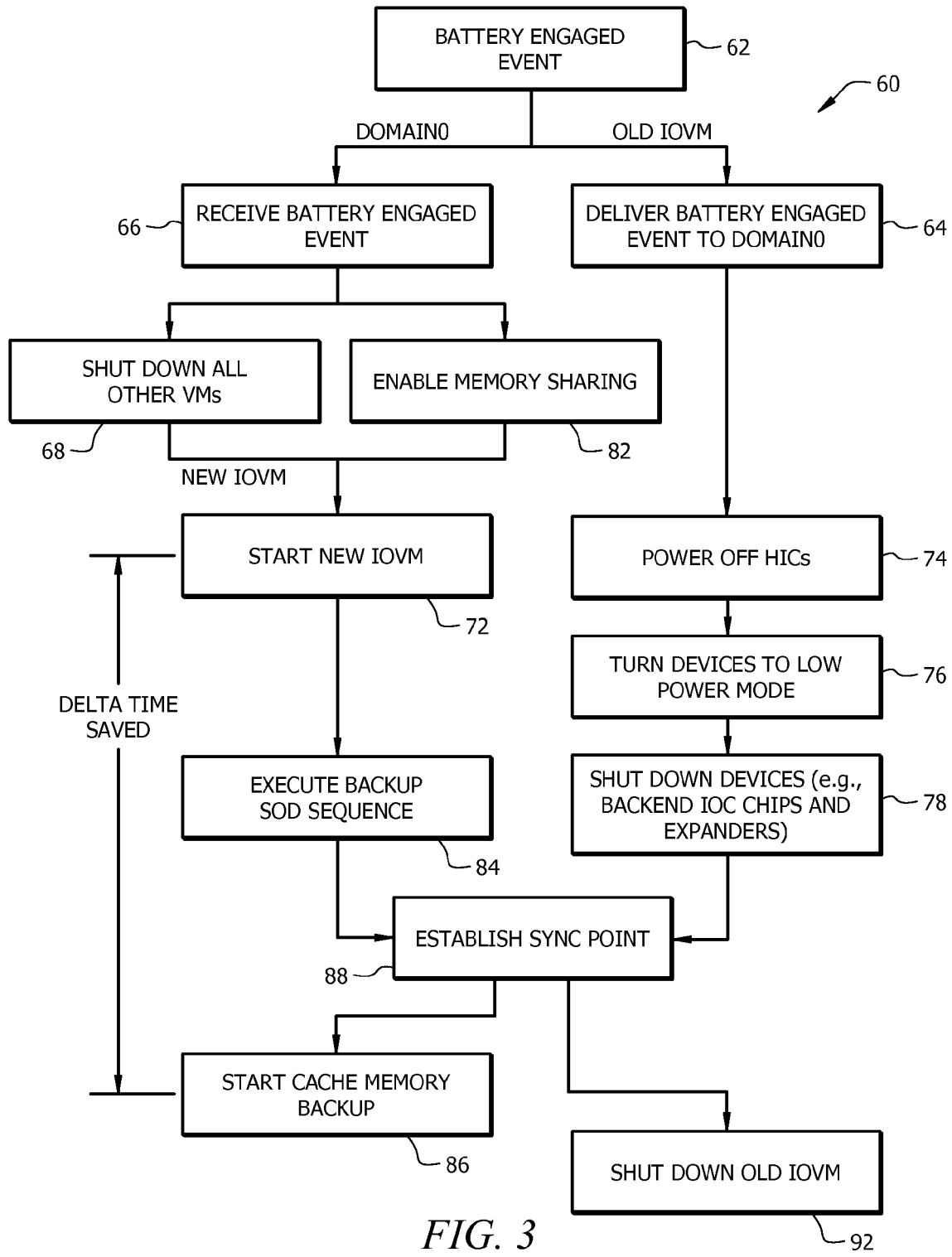
FIG. 3 is a block diagram of a method for reducing power loss to IO start time of a storage device in a storage virtualization environment according to embodiments of the invention.

Referring now to FIG. 3, shown is a block diagram 60 of a method for reducing power loss to backup IO start time of a storage device in a storage virtualization environment according to embodiments of the invention, showing the sequence of operations and activities performed by the Domain0 22, the old IOVM 24 and the new IOVM 48. It should be noted that FIG. 3 is for illustration purposes and is not to scale, e.g., in terms of specific points in time.

As discussed hereinabove, at the time of system startup, i.e., prior to any backup battery engaged event, the RAID.elf image is loaded to a Domain0 memory region and kept loaded there. When a backup battery engaged event 62 occurs, e.g., the loss of power to the storage system, the IOVM 24 receives a power loss interrupt signal. The IOVM 24 then notifies the Domain0 22 of the loss of power, i.e., the IOVM 24 delivers the battery engaged event to the Domain0 22 (shown as a battery engaged event delivery operation 64) and the Domain0 22 receives the battery engaged event (shown as a battery engaged event receive operation 66).

The Domain0 22 then shuts down or destroys the other virtual machines in the controller 14 except for the IOVM 24. This activity or operation is shown generally as a VM shut down operation 68. The Domain0 22 also starts or spawns a separate or new instance of the IOVM, e.g., a new IOVM 48. This spawning is shown generally as a starting or spawning operation 72 of the new IOVM 48.

At this point in time, as shown generally in FIG. 3, a number of operations are performed in parallel by the (old) IOVM 24 and the new IOVM 48. For example, while the Domain0 22 is spawning the new IOVM 48, the current or old instance of the IOVM, i.e., the old IOVM 24, begins powering off unwanted hardware devices, e.g., the Host Interface Cards (HICs), to reduce power consumption on the battery backed up power. This powering off is shown generally as a powering off operation 74. The old IOVM 24 also sets any hardware devices needed for data backup operations to operate in a low power mode to further reduce power consumption on the battery backed up power. This activity is shown generally as a low power mode setting operation 76. Also, the old IOVM 24 shuts down any hardware devices not necessary for data backup operations, such as the backend I/O controller (IOC) chips and the expanders. This activity is shown generally as a device shutting down operation 78.

While the Domain0 22 is spawning the new IOVM 48 (operation 72), the Domain0 22 also is enabling the memory region in the Domain0 22 where the RAID.elf image of the IOVM application is loaded to be shared with the new IOVM 48. This enablement is shown generally as an enabling memory sharing operation 82. Because of this memory sharing, the new IOVM 48 can start immediately upon its creation or spawning because the new IOVM 48 now does not need to load the RAID.elf image from the flash memory device 32 to the new IOVM memory, as is the case in conventional virtualized environments. As discussed hereinabove, eliminating the need to load the RAID.elf image from a flash memory device to IOVM memory saves approximately 8 seconds of backup battery power consumption time.

The new IOVM 48, once spawned, immediately executes a backup start-of-day (SOD) sequence, which brings up on battery power only the desired firmware components in the virtualized environment. The SOD sequence is shown generally as a backup SOD sequence operation 84. Once the SOD sequence has been performed, the new IOVM 48 can start its cache memory backup operation. This operation is shown generally as a start cache memory backup operation 86.

It should be understood that starting the operation of the new IOVM 48 in parallel with the device shutting down and setting operations of the old IOVM 24 is operationally safe for a number of reasons. For example, the new IOVM 48 executes backup-specific code (operations) only. That is, the new IOVM 48 runs a specific instance of the firmware code (i.e., a slimmed down or light version), which only brings up the required components to do backup operations. Therefore, in this manner, each of the old IOVM 24 and the new IOVM 48 executes either a different version of a start-of-day code sequence or the old IOVM 24 executes code that is exclusive to the old IOVM 24.

Also, at this point in time, the new IOVM 48 does not try to read-write to the configuration database (and cause any corruption due to concurrent access) because the configuration database is not accessible by the new IOVM 48 at this point in time. Moreover, in backup battery power mode, all mirror channels from an alternative controller to the controller 14 will be powered off. Thus, there can not be any new mirror operations that possibly could cause corruption.

Also, the new IOVM 48 can not communicate with any alternative controller because, during backup operations, alternative controller communication channels are not functioning and therefore no communication can be established with any alternative controller. Also, all host interface cards and the backend disk drives 12 also are powered off, so there is no chance of any data corruption introduced by concurrent access. Moreover, the firmware module in charge of IO handling (i.e., the Virtual Disk Manager or VDM) is not started in the backup instance of the IOVM code. However, the new IOVM 48 and the old IOVM 24 do need to be synchronized (i.e., sync up) to ensure that the cache memory is not concurrently accessed.

A sync point establishment operation 88 then is performed or executed. The sync point for the old IOVM 24 and the new IOVM 48 will be established prior to the new IOVM 48 trying to access some backup related configuration information (e.g., number of backup devices, and whether a backup occurred previously). This configuration information is stored by the firmware within the cache backup devices so that the configuration information can be accessed during a backup operation when there is no access to the configuration database (stable storage) on the backend drives. These configuration information records are handled by a separate firmware module (e.g., a pstor module).

Therefore, before trying to access any record within the pstor module, the backup-specific firmware component running in the new IOVM 48 establishes a communication channel for state synchronization with the old IOVM 24. This communication channel can be established using a special NVSRAM (non-volatile static random access memory) record, which is used to mark the various states in NVSRAM.

From the perspective of the old IOVM 24, to establish the communication channel for state synchronization with the new IOVM 48, the old IOVM 24 performs a few operations. For example, as soon as the old IOVM 24 receives a power loss interrupt signal, the old IOVM 24 marks a record in NVSRAM stating that a power loss interrupt signal is received. Thereafter, at every stage, the old IOVM 24 marks the status of the operations required to turn devices into low power mode and turning off unnecessary devices. When a stage is reached after which there is no concurrent access either to RPA (RAID parity assist) cache memory, or the backup configuration information stored in the pstor module, the old IOVM 24 writes a state to NVSRAM indicating that the old IOVM 24 is done with its operations and the new IOVM 48 now can proceed. Such state can be referred to as OFFLOAD_SYNCPT. After marking OFFLOAD_SYNCPT, the old IOVM 24 exits or is shut down (by the Domain0 22), as shown generally by a shutdown operation 92.

From the perspective of the new IOVM 48, as soon as the new IOVM 48 is spawned, the new IOVM 48 executes the backup-specific code and proceeds through its start-of-day operations. Before accessing the backup related configuration, the new IOVM 48 reads the status of the old IOVM 24 within NVSRAM. If the status of the old IOVM 24 has not reached OFFLOAD_SYNCPT, the new IOVM 48 waits for a period of time, e.g., 50 milliseconds, and then again reads the status of the old IOVM 24 within NVSRAM. The new IOVM 48 tries to read the status of the old IOVM 24 a number of times, e.g., 5 times, until it gets the OFFLOAD_SYNCPT status. If the new IOVM 48 does not get the OFFLOAD_SYNCPT status within NVSRAM after the given number of retries, the new IOVM 48 indicates to the Domain0 22 to shut down or destroy the old IOVM 24 so that the new IOVM 48 can proceed with its backup. Dirty cache data is customer data and therefore this operation is necessary in error scenarios or corner cases when the old IOVM 24 takes too much time to reach OFFLOAD_SYNCPT. Once the new IOVM 48 determines that the old IOVM 24 has reached sync point status (OFFLOAD_SYNCPT), the new IOVM 48 starts with the backup IO operation. It should be noted that initialization of the new IOVM 48 already has been completed before the new IOVM 48 checks for the sync point status.

The potential amount of backup battery power consumption time saved according to embodiments of the invention can be determined as follows. Assume that a power loss event occurs at time T1. Therefore, the power loss event signal is propagated and the spawning of the new IOVM 48 is started at time T1. The time to launch a new instance of a virtual machine (i.e., the new IOVM 48) is approximately 4 seconds. The time to perform the backup-specific start-of-day (SOD) sequence is approximately 6 seconds. The new IOVM 48 finishes its backup-specific start-of-day sequence at T1+4+6=T1+10 seconds.

The old IOVM 24 starts setting devices to low power mode at time T1. The time to put devices in low power mode is approximately 2 seconds. The time to destroy the old IOVM 24 and shut down hardware associated with the old IOVM 24 is approximately 2 seconds. Therefore, the time for the old IOVM 24 to reach OFFLOAD_SYNCPT is approximately 4 seconds.

The time at which backup IO operations can begin is the greater of T1+10 and T1+2+2=T1+10 seconds. Therefore, backup IO operations can start within approximately 10 seconds after a power loss event. As discussed hereinabove, the stipulated overhead time for the power loss to backup IO start time is approximately 12 seconds.

As discussed previously hereinabove, according to conventional operations, the time required for backup IO operations to start is approximately 22 seconds. That is, assuming a power loss event occurred at time T1, the IOVM will start setting devices to low power mode at time T1. The time required to put devices in low power mode is approximately 2 seconds. The time required to destroy the IOVM is approximately 2 seconds. The time required to launch a new IOVM is approximately 4 seconds. The time required to load RAID.elf to IOVM memory is approximately 8 seconds. The time required to execute backup specific start-of-day operations is approximately 6 seconds. Therefore, according to conventional arrangements and operations, the time required for backup IO operations to start is T1+2+2+4+8+6=T1+22 seconds.

According to embodiments of the invention, the backup IO operations can start at T1+10 seconds. Thus, compared to conventional arrangements and operations, approximately 12 seconds of back battery power consumption time has been saved, i.e., delta time saved=12 seconds. Also, given that stipulated overhead time for the power loss to backup IO start time is approximately 12 seconds, embodiments of the invention keep the backup IO operations startup time within the permissible time limit. Such time savings are paramount in a battery backup power environment where every second is precious. Such time savings also prevent the system from becoming overheated, which otherwise might prevent critical customer data from being backed up properly. Also, embodiments of the invention allow for improved estimation and budgeting of battery holdup times that can be reduced. Moreover, as discussed hereinabove, embodiments of the invention can be used across various hardware platforms that offer a virtualization environment and those that provide a cache memory for caching user data in a storage controller.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter," "then," "next," and other similar words are not intended to limit the order of the steps. These words simply are used to guide the reader through the description of the exemplary method. Also, one of ordinary skill in programming will be able to write computer code or identify appropriate hardware and/or circuits to implement the disclosed invention without difficulty, based on the flow charts and associated description in this specification. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures, which may illustrate various process flows.

Figure 4:
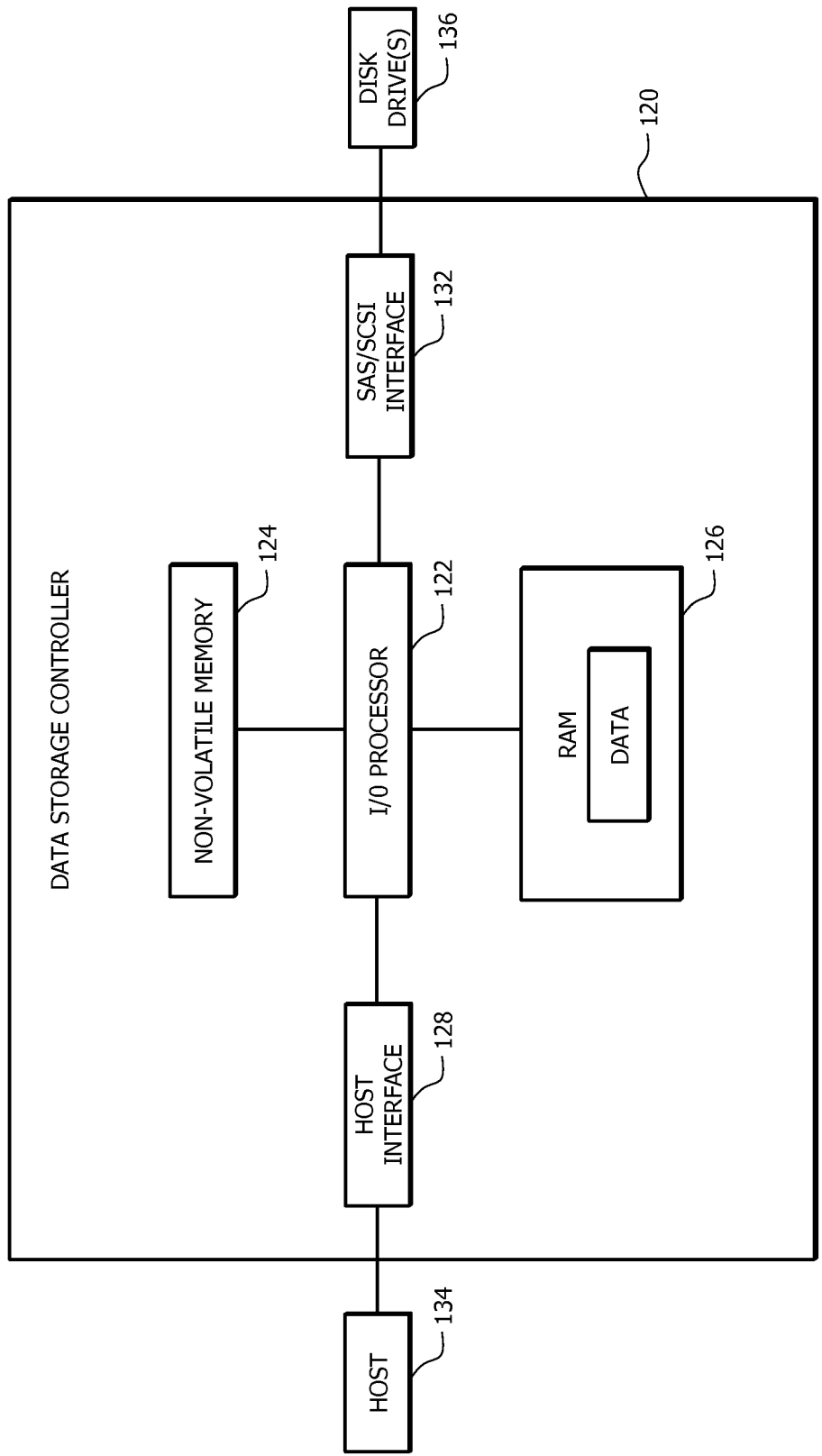
FIG. 4 is a schematic view of an apparatus for reducing power loss to IO start time of a storage device in a storage virtualization environment according to embodiments of the invention.

Referring now to FIG. 4, shown is a schematic view of a storage controller or controller device or apparatus 120 according to embodiments of the invention. The storage controller 120, such as the storage controller 14 shown in FIG. 1, manages the operation of an associated data storage device, including reading data from and writing data to the data storage device, which can be a storage array, such as a Redundant Array of Inexpensive Disks (RAID) storage array. For example, the storage controller 120 processes requests from a host system attached thereto into appropriate requests to the data storage device.

The storage controller 120 includes an input/output (I/O) processor 122, a non-volatile memory element 124 typically having firmware code programmed therein, a random access memory (RAM) element 126 typically having various data at least temporarily stored therein, a front-end or host interface 128, and one or more back-end or data storage device interfaces 132, such as a Serial Attached SCSI (SAS)/SCSI interface. The host interface 128, which interfaces with a host system 134, allows communication between the storage controller 120 and the host system 134. The SAS/SCSI interface 132, which interfaces with one or more disk drives 136 or other data storage device, such as a RAID storage array, allows data communication between the storage controller 120 and the disk drives 136.

The storage controller 120 can include any suitable conventional elements, such as microprocessors, memory and hard-wired logic, that in accordance with suitable programming or configuration logic allow the storage controller 120 to effect the functions or methods described herein, as well as any other suitable functions that persons skilled in the art understand are characteristic of conventional storage controllers. Such programming logic can be stored in the form of software or firmware that has been loaded into memory for execution by one or more processors, either on an as-needed or random-access basis or as firmware stored in non-volatile memory (e.g., programmable read-only memory).

One or more of the components within the storage controller 120, including the input/output (I/O) processor 122, the non-volatile memory element 124, the random access memory (RAM) element 126, the host interface 128, and the back-end interfaces 132, can be comprised partially or completely of any suitable structure or arrangement, e.g., one or more integrated circuits. Also, it should be understood that the storage controller 120 includes other components, hardware and software (not shown) that are used for the operation of other features and functions of the storage controller 120 not specifically described herein.

The storage controller 120 can be partially or completely configured in the form of hardware circuitry and/or other hardware components within a larger device or group of components. Alternatively, the storage controller 120 can be partially or completely configured in the form of software, e.g., as processing instructions and/or one or more sets of logic or computer code. In such configuration, the logic or processing instructions typically are stored in a data storage device (not shown). The data storage device typically is coupled to a processor, such as the I/O processor 122. The processor accesses the necessary instructions from the data storage device and executes the instructions or transfers the instructions to an appropriate location within the storage controller 120.

As discussed hereinabove, the storage controller 120 typically is programmed with read-only memory (ROM) images that contain various firmware, e.g., one or more firmware images, such as a RAID firmware image. These firmware images include various sub-modules that are executed by various hardware portions of the storage controller during the operation of the storage controller 120. Alternatively, one or more of the firmware images, such as the RAID firmware image, can be stored on a flash device (e.g., the iSATA flash drive), and loaded into RAM for execution.

In one or more aspects, the functions described may be implemented in hardware, software, firmware, or any combination thereof. If implemented in software, the functions may be stored on or transmitted as one or more instructions or code on a non-transitory computer-readable medium. Non-transitory computer-readable media includes both computer storage media and communication media including any tangible medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other tangible medium that may be used to carry or store desired program code in the form of instructions or data structures and that may be accessed by a computer.

It will be apparent to those skilled in the art that many changes and substitutions can be made to the embodiments of the invention herein described without departing from the spirit and scope of the invention as defined by the appended claims and their full scope of equivalents.

The invention claimed is:

1. A method for supplying battery power to a virtualized storage environment having a storage controller with a first virtual machine designated as a virtual machine manager and a second virtual machine, wherein the virtual machine manager has loaded in a memory portion thereof an image of the second virtual machine, the method comprising:

in response to a battery engaged event,
the virtual machine manager shutting down all virtual machines in the storage controller except for the virtual machine manager and the second virtual machine;
the virtual machine manager enabling the image of the second virtual machine to be shared with a new instance of the second virtual machine in such a way that the image of the second virtual machine does not have to be loaded into a memory portion of the new instance of the second virtual machine;
the virtual machine manager creating the new instance of the second virtual machine;
the second virtual machine shutting down hardware devices in the virtualized storage environment that are not needed for a cache memory backup operation of the storage controller;
the second virtual machine setting hardware devices in the virtualized storage environment needed for a cache memory backup operation of the storage controller to low power mode;
while the second virtual machine is setting the hardware devices needed for operation of the storage controller to low power mode, the new instance of the second virtual machine executing a backup specific start-of-day (SOD) initialization sequence;
synchronizing the new instance of the second virtual machine with the second virtual machine in such a way that a cache memory portion of the virtualized storage environment is not concurrently accessed by the second virtual machine and the new instance of the second virtual machine;
upon synchronization of the new instance of the second virtual machine with the second virtual machine, initiating a cache memory backup operation; and
upon synchronization of the new instance of the second virtual machine with the second virtual machine, shutting down the second virtual machine.

2. The method as recited in claim 1, wherein at least one of the second virtual machine shutting down hardware devices not needed for a cache memory backup operation of the storage controller and the second virtual machine setting the hardware devices needed for a cache memory backup operation of the storage controller to low power mode is performed while the new instance of the second virtual machine is being created by the virtual machine manager.

3. The method as recited in claim 1, wherein the second virtual machine setting the hardware devices needed for a cache memory backup operation of the storage controller to low power mode includes at least one of manipulating hardware device states and accessing hardware device registry bits or hardware device firmware handling power to the device.

4. The method as recited in claim 1, further comprising detecting by the second virtual machine the battery engaged event and delivering a battery engaged event notification to the virtual machine manager.

5. The method as recited in claim 1, wherein the image of the second virtual machine is a RAID.elf image.

6. The method as recited in claim 1, wherein the virtual machine manager is a Domain0 virtual machine, and wherein the second virtual machine is an input/output virtual machine (IOVM).

7. The method as recited in claim 1, wherein the at least one second virtual machine includes an input/output virtual machine (IOVM), a Network Attached Storage virtual machine (NAS VM) and a Service virtual machine (Service VM).

8. A storage controller device, comprising:
an interface configured to couple the storage controller device to at least one data storage device; and
a processor coupled to the interface and configured to read data from and write data to the at least one data storage device,
wherein the storage controller device includes a storage controller that hosts a virtualized storage environment having a first virtual machine designated as a virtual machine manager and a second virtual machine, wherein the virtual machine manager has loaded in a memory portion thereof an image of the second virtual machine,
wherein the storage controller device is configured to, in response to a battery engaged event,
direct the virtual machine manager to shut down all virtual machines in the storage controller except for the virtual machine manager and the second virtual machine;
direct the virtual machine manager to create a new instance of the second virtual machine;
direct the virtual machine manager to enable the image of the second virtual machine to be shared with the new instance of the second virtual machine in such a way that the image of the second virtual machine does not have to be loaded into a memory portion of the new instance of the second virtual machine;
direct the second virtual machine to shut down hardware devices not needed for a cache memory backup operation of the storage controller;
direct the second virtual machine to set hardware devices needed for a cache memory backup operation of the storage controller to low power mode;
while the second virtual machine is setting the hardware devices needed for a cache memory backup operation of the storage controller to low power mode, direct the new instance of the second virtual machine to execute a backup specific start-of-day (SOD) initialization sequence;
synchronize the new second virtual machine with the second virtual machine in such a way that a cache memory portion of the virtualized storage environment is not concurrently accessed by the second virtual machine and the new second virtual machine;
upon synchronization of the new second virtual machine with the second virtual machine, initiate a cache memory backup operation; and
shut down the second virtual machine.

9. The storage controller device as recited in claim 8, wherein the storage controller device is configured to direct the second virtual machine to shut down hardware devices not needed for a cache memory backup operation of the storage controller while at least one of the new instance of the second virtual machine is being created by the virtual machine manager and the image of the second virtual machine is being enabled by the virtual machine manager for sharing with the new instance of the second virtual machine.

10. The storage controller device as recited in claim 8, wherein the storage controller device is configured to direct the second virtual machine to set the hardware devices needed for a cache memory backup operation of the storage controller to low power mode while at least one of the new instance of the second virtual machine is being created by the virtual machine manager and the image of the second virtual machine is being enabled by the virtual machine manager for sharing with the new instance of the second virtual machine.

11. The storage controller device as recited in claim 8, wherein the virtual machine manager includes a virtual machine (VM) management module configured to perform at least one of shutting down all virtual machines in the storage controller except for the virtual machine manager, the second virtual machine and creating a new instance of the second virtual machine, and enabling the image of the second virtual machine to be shared with the new instance of the second virtual machine in such a way that the image of the second virtual machine does not have to be loaded into a memory portion of the new instance of the second virtual machine.

12. The storage controller device as recited in claim 8, wherein the second virtual machine includes a battery management module configured to perform at least one of shutting down hardware devices not needed for a cache memory backup operation of the storage controller and setting hardware devices needed for a cache memory backup operation of the storage controller to low power mode.

13. The storage controller device as recited in claim 8, wherein the second virtual machine is configured to set the hardware devices needed for a cache memory backup operation of the storage controller to low power mode by at least one of manipulating hardware device states and accessing hardware device registry bits or hardware device firmware handling power to the device.

14. The storage controller device as recited in claim 8, wherein the second virtual machine is configured to detect the battery engaged event and to notify the virtual machine manager of the battery engaged event.

15. The storage controller device as recited in claim 8, wherein the image of the second virtual machine is a RAID-.elf image.

16. The storage controller device as recited in claim 8, wherein the virtual machine manager is a Domain0 virtual machine, and wherein the second virtual machine is an input/output virtual machine (IOVM).

17. A non-transitory computer readable medium storing instructions that carry out a method for supplying battery power to a virtualized storage environment having a storage controller with a first virtual machine designated as a virtual machine manager and a second virtual machine, wherein the virtual machine manager has loaded in a memory portion thereof an image of the second virtual machine, the non-transitory computer readable medium comprising:

in response to a battery engaged event,
instructions for shutting down all virtual machines in the storage controller except for the virtual machine manager and the second virtual machine;
instructions for enabling the image of a second virtual machine to be shared with the new instance of the second virtual machine in such a way that the image of the second virtual machine does not have to be loaded into a memory portion of the new instance of the second virtual machine;
instructions for creating the new instance of the second virtual machine;
instructions for shutting down hardware devices in the virtualized storage environment that are not needed for a cache memory backup operation of the storage controller;
instructions for setting hardware devices in the virtualized storage environment needed for a cache memory backup operation of the storage controller to low power mode;
instructions for executing a backup specific start-of-day (SOD) initialization sequence while the second virtual machine is setting the hardware devices needed for operation of the storage controller to low power mode;
instructions for synchronizing the new instance of the second virtual machine with the second virtual machine in such a way that a cache memory portion of the virtualized storage environment is not concurrently accessed by the second virtual machine and the new instance of the second virtual machine;
instructions for initiating a cache memory backup operation upon synchronization of the new instance of the second virtual machine with the second virtual machine; and
instructions for shutting down the second virtual machine upon synchronization of the new instance of the second virtual machine with the second virtual machine.

18. The non-transitory computer readable medium as recited in claim 17, wherein at least one of the second virtual machine shutting down hardware devices not needed for a cache memory backup operation of the storage controller and the second virtual machine setting the hardware devices needed for a cache memory backup operation of the storage controller to low power mode is performed while the new instance of the second virtual machine is being created by the virtual machine manager.

19. The non-transitory computer readable medium as recited in claim 17, wherein the second virtual machine setting the hardware devices needed for a cache memory backup operation of the storage controller to low power mode includes at least one of manipulating hardware device states and accessing hardware device registry bits or hardware device firmware handling power to the device.

20. The non-transitory computer readable medium as recited in claim 17, further comprising instructions for detecting by the second virtual machine the battery engaged event and instructions for delivering a battery engaged event notification to the virtual machine.

* * * * *